United States Patent [19]

Pfeifer

[11] 4,255,559
[45] Mar. 10, 1981

[54] TRANSPARENT COPOLYAMIDE FROM 1,10-DISUBSTITUTED-1,10 DIAMINE

[75] Inventor: Josef Pfeifer, Therwil, Switzerland

[73] Assignee: Ciba-Geigy Corporation, Ardsley, N.Y.

[21] Appl. No.: 83,145

[22] Filed: Oct. 9, 1979

[30] Foreign Application Priority Data

Oct. 18, 1978 [CH] Switzerland ............ 10774/78

[51] Int. Cl.³ ............................ C08G 69/26
[52] U.S. Cl. ............... 528/338; 528/339; 528/340; 528/346; 528/347; 528/349
[58] Field of Search .......... 528/338, 346, 347, 349, 528/339, 340

[56] References Cited

U.S. PATENT DOCUMENTS

| | | | |
|---|---|---|---|
| 3,597,400 | 8/1971 | Kashiro et al. | 528/338 |
| 3,939,147 | 2/1976 | Hugelin et al. | 260/239 BC |
| 4,100,111 | 7/1978 | Peter et al. | 528/116 |

FOREIGN PATENT DOCUMENTS 1548431  7/1979  United Kingdom .

OTHER PUBLICATIONS

Chemical Abstracts, 49, (1955), 4330b.

*Primary Examiner*—Harold D. Anderson
*Attorney, Agent, or Firm*—Luther A. R. Hall

[57] ABSTRACT

There are described transparent copolyamides which are obtained by reaction of a mixture A) consisting of essentially stoichiometric amounts of a diamine of the formula

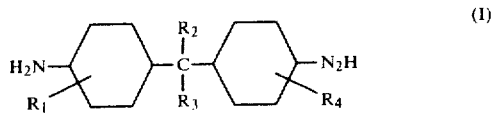

and isophthalic acid, a mixture of isophthalic acid and terephthalic acid, or amide-forming derivatives thereof, in a molar ratio isophthatic acid(derivative) : terephthalic acid(derivative) of 5:5 to 10:0, with a mixture B) consisting of essentially stoichiometric amounts of a diamine of the formula

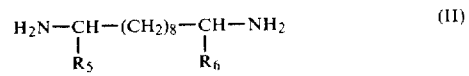

and a dicarboxylic acid of the formula

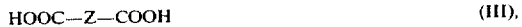

or an amide-forming derivative thereof [$R_1$ to $R_4$ independently of each other are each H or $C_{1-4}$-alkyl, the proportion of mixture A) is 40–60 percent by weight, and $R_5$ and $R_6$ independently of one another are each cycloalkyl which has 5–12 ring C atoms and which is unsubstituted or is substituted by $C_{1-4}$-alkyl, or they are each isopropyl, sec-butyl or isobutyl; or the proportion of mixture A) is 50–70 percent by weight, $R_5/R_6$ =—CH($R_7$) ($R_8$), $R_7$ is H or $C_{2-8}$-alkyl, $R_8$ is $C_{2-8}$-alkyl, and Z is $C_{4-14}$ alkylene]. The novel copolyamides are distinguished by good thermoplastic processing characteristics, low water absorption, and good stability to hydrolysis, and they are suitable for producing transparent moulded articles.

8 Claims, No Drawings

TRANSPARENT COPOLYAMIDE FROM 1,10-DISUBSTITUTED-1,10 DIAMINE

The present invention relates to novel transparent copolyamides, to processes for producing them, and to the use thereof for the production of moulded articles.

Transparent copolyamides formed from cycloaliphatic diamines, particularly 4,4′-diaminodicyclohexylmethane, isphthalic acid and aliphatic components, such as amino acids, aliphatic diamines and dicarboxylic acids, are known from the German Offenlegungsschrift No. 2,642,244. These aliphatic components have to contain, relative to each amide group or to each pair of amide-forming groups, on average at least 9 methylene groups; and the number of methylene groups between the amide-forming groups has to be at least 6. If these systems are used with the aim of producing copolyamides having high glass transition temperatures, the products obtained are brittle and suffer a relatively high water absorption. Other transparent copolyamides from 4,4′-diaminodicyclohexylmethane, hexamethylenediamine, isophthalic acid and terephthalic acid are described in the U.S. Pat. No. 3,597,400. These copolyamides absorb a very considerable amount of water, and their glass transition temperatures decrease appreciably on immersion in water. Finally, transparent polyamides formed from 4,4′-diaminodicyclohexylmethane and isophthalic acid are described in the U.S. Pat. No. 2,696,482. These polyamides have a very high melt viscosity and absorb a great amount of water, and only with difficulty can they be condensed in the melt or processed from the melt.

There have now been found novel transparent copolyamides formed from aromatic dicarboxylic acids, 4,4′-diaminodicyclohexylalkanes, aliphatic dicarboxylic acids and long-chain, branched alkylenediamines, which copolyamides are free from the disadvantages mentioned above.

The transparent copolyamides according to the invention have a reduced specific viscosity of at least 0.5 dl/g, preferably of about 0.7 to about 1.8 dl/g, and especially of about 0.75 to about 1.2 dl/g, measured on a 0.5% solution in m-cresol at 25° C. (in the following referred to also as reduced solution viscosity); and are produced by reaction of a mixture (A) of essentially stoichiometric amounts of a diamine of the formula I

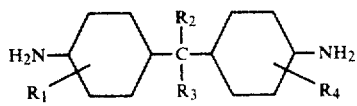

and isophthalic acid, or an amide-forming derivative thereof, or a mixture of isophthalic acid and terephthalic acid, or amide-forming derivatives thereof, in a molar ratio of isophthalic acid(derivative) : terephthalic acid(derivative) of 5:5 to 10.0, with a mixture (B) of essentially stoichiometric amounts of a diamine of the formula II

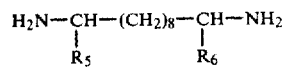

and a dicarboxylic acid of the formula III

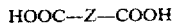

or an amide-forming derivative thereof, wherein
  $R_1$ to $R_4$ independently of one another are each hydrogen or alkyl having 1–4 C atoms,
  $R_5$ and $R_6$ independently of one another are each cycloalkyl which has 5–12 ring C atoms and which is unsubstituted or substituted by $C_{1-4}$-alkyl, or they are each isopropyl, sec-butyl, isobutyl or $—CH(R_7)(R_8)$,
  $R_7$ is hydrogen or alkyl having 2–8 C atoms,
  $R_8$ is alkyl having 2–8 C atoms, and
  Z is alkylene having 4–14 C atoms;
and the proportion of mixture (A) if $R_5$ and $R_6$ independently of one another are each cycloalkyl which has 5–12 ring C atoms and which is unsubstituted or substituted by $C_{1-4}$-alkyl, or are each isopropyl, sec-butyl or isobutyl, is 40–60 percent by weight, and if $R_5$ and $R_6$ independently of one another are each a group $—CH(R_7)(R_8)$ it is 50–70 percent by weight, with these weight percentages in the case of amide-forming derivatives of isophthalic acid, of terephthalic acid or of a dicarboxylic acid of the formula III relating to identical functional groups.

The copolyamides according to the invention are characterised by high glass transition temperatures and accordingly by high dimensional stability under heat, by good thermoplastic processing characteristics, by low water absorption combined with reduced dependence of the mechanical and electrical properties on the surrounding humidity, and by improved stability to hydrolysis. The novel copolyamides retain high softening temperatures even in the water-saturated condition, and are resistant to boiling water.

Alkyl groups denoted by $R_1$ to $R_4$, $R_7$ or $R_8$ or alkyl substituents on cycloalkyl groups $R_5$ or $R_6$ can be straight-chain or branched, but are preferably straight-chain. Examples of alkyl groups of this type are: the methyl, ethyl, n-propyl, isopropyl, n- and sec-butyl, n-pentyl, n-hexyl, n-heptyl and n-octyl groups.

Alkyl groups $R_1$ to $R_4$ preferably contain 1 or 2 C atoms. Particularly preferably, $R_2$ and $R_3$ are each hydrogen, and $R_1$ and $R_4$ are each methyl.

If cycloalkyl groups $R_5$ or $R_6$ are substituted by alkyl groups, they are in particular cycloalkyl substituted by a methyl or ethyl group. Cycloalkyl groups $R_5$ and $R_6$ are however preferably unsubstituted and contain 5–8 ring C atoms. $R_5$ and $R_6$ are particularly preferably the cyclopentyl group and especially the cyclohexyl group.

$R_7$ is preferably hydrogen, or alkyl having 2–4 C atoms, while alkyl groups $R_8$ are preferably those having 2–6 C atoms.

Alkylene groups Z can be straight-chain or branched-chain. Examples that may be mentioned are: the tetramethylene, pentamethylene, hexamethylene, 1,3,3-trimethyltetramethylene, 1,1,3-trimethyltetramethylene, heptamethylene, octamethylene, decamethylene, dodecamethylene and tetradecamethylene groups. Straight-chain alkylene groups having 4–10 C atoms are preferred, particularly the tetramethylene group.

Preferred copolyamides according to the invention are those which are obtained by rection of a mixture (A) consisting of essentially stoichiometric amounts of a diamine of the formula I and isophthalic acid, or an amide-forming derivative thereof, with a mixture (B) consisting of essentially stoichiometric amounts of a diamine of the formula II and adipic acid or an amide-forming derivative thereof, wherein $R_1$ to $R_4$ independently of one another are each hydrogen or methyl, and $R_5$ and $R_6$ are each cycloalkyl having 5-8 ring C atoms, and wherein the proportion of mixture (A) is 45-55 percent by weight, with these weight percentages in the case of amide-forming derivatives of isophthalic acid or of adipic acid relating to identical functional groups; particularly copolyamides of the aforementioned type wherein $R_1$ and $R_4$ are each methyl, $R_2$ and $R_3$ are each hydrogen, and $R_5$ and $R_6$ are each cyclohexyl, and the proportion of mixture (A) is 45-50 percent by weight.

Further preferred copolyamides are those which are obtained by reaction of a mixture (A) consisting of essentially stoichiometric amounts of a diamine of the formula I and isophthalic acid, or an amide-forming derivative thereof, with a mixture (B) consisting of essentially stoichiometric amounts of a diamine of the formula II and adipic acid or an amide-forming derivative thereof, wherein $R_1$ to $R_4$ independently of one another are each hydrogen or methyl, and $R_5$ and $R_6$ are each isopropyl, isobutyl or sec-butyl, and wherein the proportion of mixture (A) is 50-60 percent by weight, with these weight percentages in the case of amide-forming derivatives of isophthalic acid or adipic acid relating to identical functional groups; particularly those copolyamides wherein $R_1$ and $R_4$ are each methyl, $R_2$ and $R_3$ are each hydrogen, and $R_5$ and $R_6$ are each isopropyl, and wherein the proportion of mixture (A) is 50-55 percent by weight.

Finally, preferred copolyamides are those which are obtained by reaction of a mixture (A) consisting of essentially stoichiometric amounts of a diamine of the formula I and isophthalic acid, or an amide-forming derivative thereof, with a mixture (B) consisting of essentially stoichiometric amounts of a diamine of the formula II and adipic acid, or an amide-forming derivative thereof, wherein $R_1$ to $R_4$ independently of one another are each hydrogen or methyl, $R_5$ and $R_6$ are each a group $-CH(R_7)(R_8)$, $R_7$ is hydrogen or alkyl having 2-4 C atoms, and $R_8$ is alkyl having 2-6 C atoms, and wherein the proportion of mixture (A) is 55-68 percent by weight, with these weight percentages in the case of amide-forming derivatives of isophthalic acid or of adipic acid relating to identical functional groups. More especially preferred copolyamides are those of the last-mentioned type wherein $R_1$ and $R_4$ are each methyl, $R_2$ and $R_3$ are each hydrogen, $R_7$ is hydrogen, and $R_8$ is n-pentyl, and wherein the proportion of mixture (A) is 60-66 percent by weight.

As amide-forming derivatives of terephthalic acid, of isophthalic acid or of aliphatic dicarboxylic acids of the formula III, it is possible to use for example the corresponding dihalides, especially the dichlorides, dinitriles or dialkyl or diaryl esters, particularly dialkyl esters having 1-4 C atoms in each of the alkyl moieties, and diphenyl esters.

The reaction of the reaction components according to definition can be performed by methods known per se. Production by the melt-polycondensation process in several stages is preferred. The diamines and the dicarboxylic acids are in this case pre-condensed in essentially stoichiometric amounts in a closed vessel at temperatures of about 240° to 290° C., optionally with the addition of water, in an inert gas. The diamines can advantageously be used in the form of their salts with the dicarboxylic acids as defined. A preferred embodiment comprises using a diamine of the formula I and isophthalic acid, or a mixture of iso- and terephthalic acid, as a mixture, and the diamines of the formula II and the dicarboxylic acids of the formula III in the form of salts. The salts to be used for pre-condensation are advantageously produced individually from essentially stoichiometric amounts of dicarboxylic acid of the formula III and diamine of the formula II, or of isophthalic acid or of a mixture of iso- and terephthalic acid and diamine of the formula I, in suitable inert organic solvents. The inert organic solvents are for example: cycloaliphatic alcohols, such as cyclopentanol and cyclohexanol, and particularly aliphatic alcohols having up to 6 C atoms, such as methanol, ethanol, n-propanol, butanols, pentanols and hexanols, and also mixtures of such solvents with water. The precondensate can be subsequently further condensed at temperatures between about 260° and 300° C., under normal pressure and in an inert-gas atmosphere, until the copolyamides according to the invention have been formed. It can be of advantage under certain circumstances to apply a vacuum after completion of polycondensation, in order to degas the polyamide.

The above described polycondensation, including precondensation, can be performed also without pressure using a more simple process, wherein the reaction temperature is raised in the course of the reaction from about 220° to about 280° C.

The copolyamides according to the invention can be produced also by melt- or solvent-polycondensation of diamines of the formulae I and II with essentially stoichiometric amounts of activated esters of iso- or terephthalic acid and of dicarboxylic acids of the formula III. Suitable activated esters are in particular the corresponding diphenyl esters. The reaction temperatures are in general between about 230° and 300° C.

The diamines of the formula I and the dicarboxylic acids of the formula III are known. The diamines of the formula II are likewise known, or they can be produced by the process described in the German Offenlegungsschrift No. 2,549,403, wherein 1,2-diaza-1,5,9-cyclododecatriens or 1,2-diaza-cyclododecenes, appropriately substituted in the 3,12-position, are catalytically hydrogenated in the presence of an inert organic solvent.

The copolyamides according to the invention have a transparent appearance and high glass transition temperatures, but can nevertheless be very readily thermoplastically processed, for example by the injection moulding process or extrusion process. They are distinguished also by low water absorption, good stability to hydrolysis, resistance to boiling water, and negligible impairment of the mechanical and electrical properties by the action of moisture.

The copolyamides according to the invention can be processed, by methods known per se, into transparent moulded articles of the widest variety, such as transparent apparatus and parts of apparatus.

EXAMPLE 1

Production of salts from a diamine of the formula II and a dicarboxylic acid of the formula III 0.2 mol of a dicarboxylic acid of the formula III is dissolved in 200 ml of 96% ethanol at 50° C. Into this solution is poured 0.2 mol of a diamine of the formula II which is likewise dissolved in 200 ml of 96% ethanol. If the diamine used is one having short alkyl groups in the 1,10-position (isopropyl, isobutyl) or having cycloalkyl groups in the 1,10-position (cyclohexyl, cyclooctyl), the salt which is forming precipitates immediately. If however it is a diamine having longer alkyl side chains in the 1,10-position (3-pentyl, 3-heptyl, n-hexyl), the salt remains in solution, and is precipitated by the addition of about 400 ml of petroleum ether. After cooling to 0°–5° C., the salt is filtered off, and is dried in a water-jet vacuum at 90° C. The following salts were obtained by this method:

| Designation | Composition | Yield (% of theory) |
|---|---|---|
| salt A | 1,10-diamino-1,10-dicyclohexyl-decane/adipic acid | 94 |
| salt B | 1,10-diamino-1,10-dicyclohexyl-decane/sebacic acid | 78 |
| salt C | 1,10-diamino-1,10-dicyclohexyl-decane/dodecane diacid(1,12) | 83 |
| salt D | 1,10-diamino-1,10-di-isopropyl-decane/adipic acid, | 97 |
| salt E | 1,10-diamino-1,10-di-isopropyl-decane/sebacic acid | 91 |
| salt F | 1,10-diamino-1,10-diisopropyl-decane/dodecane diacid(1,12) | 85 |
| salt G | 1,10-diamino-1,10-dicyclooctyl-decane/adipic acid | 92 |
| salt H | 1,10-diamino-1,10-diisobutyldecane/adipic acid | 98 |
| salt I | 1,10-diamino-1,10-di-n-hexyldecane/adipic acid | 82 |
| salt K | 1,10-diamino-1,10-di-n-hexyldecane/sebacic acid | 74 |
| salt L | 1,10-diamino-1,10-di-n-hexyldecane/dodecane diacid(1,12) | 68 |
| salt M | 1,10-diamino-1,10-di-(3-pentyl)-decane/adipic acid | 89 |
| salt N | 1,10-diamino-1,10-di-(3-heptyl)-decane/adipic acid. | 63 |

EXAMPLE 2–19

The following components are weighed into a bomb tube fitted with a screw cover and with a high-pressure relief valve:

(a) 4,4'-diamino-3,3'-dimethyldicyclohexylmethane, (b) an amount of isophthalic acid equivalent to this diamine, (c) a salt from a dicarboxylic acid of the formula III and a diamine of the formula II, as described in Example 1.

After the air in the bomb tube has been completely expelled by nitrogen or by some other inert gas, the bomb tube is closed and is immersed in a salt bath at 260° C. A transparent melt has formed after 30 to 60 minutes. After a total of 2 hours, the pre-condensation reaction is discontinued by removing the bomb tube from the salt bath and releasing the excess pressure by opening the valve. The contents of the bomb tube are transferred to a condensation vessel, and are then polycondensed for 6 hours at 270° C. while nitrogen is being passed through the vessel, the reaction water being continuously removed with the flow of nitrogen. The melt on cooling solidifies to form a transparent substance.

In each case, 2–3 g of the prepared copolyamides is moulded, in a heatable hydraulic press at 270° C., into a sheet having a thickness of about 0.4 to 1 mm. In order to determine the water absorption, the sheets are exposed at room temperature (20°–25° C.) to a relative humidity of 65% until equilibrium has been established, that is to say, until no further increase in weight can be ascertained. Depending on the thickness of the sheet, the time necessary for this to be attained varies between 10 and 60 days.

In Table 1 are given the composition and properties of the copolyamides. With regard to the composition, there is given the proportion of salt formed from the dicarboxylic acid of the formula III and the diamine of the formula II in percent by weight, relative to the total weight of all the individual components. The difference with respect to 100 percent by weight is made up of an equimolar mixture of 4,4'-diamino-3,3'-dimethyldicyclohexylmethane and isophthalic acid.

The viscosity $\eta$ red. $= \eta$ rel. $- 1/c$ is based on measurements made on a 0.5% solution of the respective copolyamide in m-cresol at 25° C. The glass transition temperatures were measured in a differential calorimeter (DSC). In the case of the values for water absorption, these are saturation values at room temperature. The resistance of the transparency to boiling water is very good for all the copolyamides concerned, that is to say, no impairment of the transparency can be detected even after several days' exposure.

TABLE 1

| Ex. No. | Salt addition | wt. % | $\gamma$ red. dl/g | Glass transition temperature °C. | Water absorption with 65% rel. humidity (wt. %) | Resistance to boiling water |
|---|---|---|---|---|---|---|
| 2 | salt I | 34 | 0.79 | 173 | 2.0 | very good |
| 3 | salt I | 40 | 0.83 | 161 | 1.9 | very good |
| 4 | salt I | 44 | 0.92 | 157 | 1.8 | very good |
| 5 | salt K | 34 | 0.82 | 174 | 1.8 | very good |
| 6 | salt L | 34 | 0.84 | 173 | 1.7 | very good |
| 7 | salt A | 50 | 0.93 | 176 | 2.0 | very good |
| 8 | salt A | 55 | 0.86 | 169 | 1.9 | very good |
| 9 | salt B | 46 | 0.82 | 162 | 1.4 | very good |
| 10 | salt C | 46 | 0.90 | 160 | 1.3 | very good |
| 11 | salt G | 50 | 1.08 | 171 | 1.8 | very good |
| 12 | salt G | 56 | 0.92 | 164 | 1.6 | very good |
| 13 | salt D | 50 | 0.95 | 159 | 2.0 | very good |
| 14 | salt E | 44 | 0.91 | 164 | 1.9 | very good |
| 15 | salt F | 44 | 0.97 | 162 | 1.7 | very good |
| 16 | salt H | 50 | 0.86 | 159 | 1.8 | very good |
| 17 | salt H | 42 | 0.84 | 171 | 2.1 | very good |
| 18 | salt M | 36 | 1.12 | 168 | 2.1 | very good |
| 19 | salt N | 38 | 0.75 | 167 | 1.7 | very good |

EXAMPLE 20

The following substances are weighed into a condensation tube:

(a) 1.4156 g of 4,4'-diamino-3,3'-dimethyldicyclohexylmethane, (b) 0.977 g of isophthalic acid (component (a) and (b) together = 50 percent by weight), (c) 1.578 g of 1,10-diamino-1,10-di-(2-butyl)- decane, (d) 0.794 g of adipic acid (components (c) and (d) together = 50 percent by weight).

This mixture is heated under nitrogen to 220° C.; a homogeneous melt is gradually formed, and polycondensation proceeds with the splitting-off of water. The temperature is raised after one hour to 240° C., after a further one hour to 260° C., and again after one hour to 270° C. The melt is then held at this temperature for 3 hours while nitrogen is passed through. On cooling, the melt solidifies to form a transparent colourless substance; η red. =0.88 dl/g (measured on a 0.5% solution in m-cresol at 25° C.); glass transition temperature 160° C.; and water absorption with 65% relative humidity = 1.9 per cent by weight. The resistance to boiling water is very good.

EXAMPLE 21

The following constituents are weighed into a bomb tube:
(a) 5.651 g of 4,4′-diamino-3,3′-dimethyldicyclohexylmethane,
(b) 3.94 g of isophthalic acid,
(c) 3,645 g of 1,10-diamino-1,10-di-n-hexyldecane,
(d) 2.007 g of azelaic acid,
and polycondensed to a polyamide under the conditions given in Example 2. The polyamide is subsequently moulded at 270° C. into the form of a sheet, on which the physical properties are determined: reduced solution viscosity =0.88 dl/g (0.5% in m-cresol); glass transition temperature = 109° C.; water absorption = 1.7 percent by weight (with 65% relative humidity); and resistance to boiling water is very good.

EXAMPLE 22

A polyamide is produced from the following components in the manner described in Example 21, and the physical properties are determined:
(a) 2.403 g of 2,2-bis-(4-aminocyclohexyl)-propane,
(b) 1.673 g of isophthalic acid,
(c) 1.905 g of 1,10-diamino-1,10-di-n-hexyldecane, and
(d) 0.816 g of adipic acid;
reduced solution viscosity: 0.77 dl/g (0.5% in m-cresol),
glass transition temperature: 163° C.,
water absorption: 1.9 percent by weight (65% relative humidity, and
resistance to boiling water: very good.

The diamines of the formula II which are used in the above Examples can be obtained, using the process described in the German Offenlegungsschrift No. 2,549,403, by catalytic hydrogenation of 1,2-diaza-1,5,9-cyclododecatrienes or 1,2-diaza-cyclododecenes, appropriately substituted in the 3,12-position:

1,10-diamino-1,10-dicyclohexyldecane by catalytic hydrogenation of 3,12-dicyclohexyl-1,2-diaza-1,5,9-cyclododecatriene (diastereoisomeric mixture); colourless oil [b.p. 190°–193° C./7 Pa; $n_D^{20}$ = 1.4944; IR (liquid) inter alia bands at 3,355, 3,278, 1,613 cm$^{-1}$];

1,10-diamino-1,10-di-isopropyldecane by catalytic hydrogenation of 3,12-diisopropyl-1,2-diaza-1,5,9-cyclododecatriene (diastereoisomeric mixture); colourless oil [b.p. 106°–109° C./1.3 Pa; $n_D^{20}$ = 1.4600; IR (liquid) inter alia bands at 3,355, 3,278, 1,613 cm$^{-1}$];

1,10-diamino-1,10-dicyclooctyldecane by catalytic hydrogenation of 3,12-dicyclooctyl-1,2-diaza-1,5,9-cyclodecene; colourless oil [$n_D^{20}$ = 1.5050; IR (liquid) inter alia bands at 3,333, 3,278, 1,613 cm$^{-1}$];

1,10-diamino-1,10-diisobutyldecane by catalytic hydrogenation of 3,12-diisobutyl-1,2-diaza-1,5,9-cyclododecatriene (diasteroisomeric mixture); colourless oil [b.p. 168°–172° C./5 Pa; $n_D^{20}$ = 1.4561; IR (liquid) inter alia bands at 3,289, 3,205, 1,600 cm$^{-1}$];

1,10-diamino-1,10-di-n-hexyldecane by catalytic hydrogenation of 3,12-di-n-hexyl-1,2-diazacyclododecene (diastereoisomeric mixture); colourless oil [b.p. 184° C./2.6–0.7 Pa; $n_D^{20}$ = 1.4624; IR (liquid) inter alia bands at 3,355, 3,278, 1,613 cm$^{-1}$];

1,10-diamino-1,10-di-(3-pentyl)-decane by catalytic hydrogenation of 3,12-di-(3-pentyl)-1,2-diazacyclododecene; colourless oil [b.p. 141°–143° C./0.5 Pa; $n_D^{20}$ = 1.4666; IR (liquid) inter alia bands at 3,378, 3,278, 1,613 cm$^{-1}$];

1,10-diamino-1,10-di-(3-heptyl)-decane by catalytic hydrogenation of 3,12-di-(3-heptyl)-1,2-diazacyclododecene (diasteroisomeric mixture); colourless oil [b.p. 170° C./1.3 Pa; $n_D^{20}$ = 1.4662; IR (liquid) inter alia bands at 3,278, 1,613 cm$^{-1}$]; and 1,10-diamino-1,10-di-(2-butyl)-decane by catalytic hydrogenation of 3,12-di-(2-butyl)-1,2-diaza-1,5,9-cyclo dodecatriene (diastereoisomeric mixture); colourless oil [b.p. 143°–145° C./7 Pa; $n_D^{20}$ = 1.4639; IR (liquid) inter alia bands at 3,330, 1,626 cm$^{-1}$].

The 1,2-diaza-1,5,9-cyclododecatrienes and 1,2-diazacyclododecenes can be produced by the methods described in the German Offenlegungsschriften Nos. 2,330,087 and 2,549,403.

What is claimed is:
1. A transparent copolyamide having a reduced specific viscosity of at least 0.5 dl/g, measured on a 0.5% solution in m-cresol at 25° C., which copolyamide is obtained by reaction of a mixture (A) consisting of essentially stoichiometric amounts of a diamine of the formula I

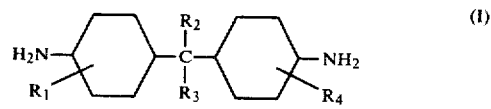

and isophthalic acid, or an amide-forming derivative thereof, or a mixture of isophthalic acid and terephthalic acid, or amide-forming derivatives thereof, in a molar ratio of isophthalic acid(derivative) : terephthalic acid(derivative of 5:5 to 10:0, with a mixture (B) consisting of essentially stoichiometric amounts of a diamine of the formula II

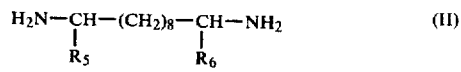

and a dicarboxylic acid of the formula III

or an amide-forming derivative thereof, wherein
$R_1$ to $R_4$ independently of one another are each hydrogen or alkyl having 1–4 C atoms,
$R_5$ and $R_6$ independently of one another are each cycloalkyl which has 5–12 ring C atoms and which is unsubstituted or substituted by $C_{1-4}$-alkyl, or they are each isopropyl, sec-butyl, isobutyl or —CH($R_7$)($R_8$), is hydrogen or alkyl having 2–8 C atoms,
$R_8$ is alkyl having 2–8 C atoms, and
Z is alkylene having 4–14 C atoms,
and the proportion of mixture A) if $R_5$ and $R_6$ independently of one another are each cycloalkyl which has 5–12 ring C atoms and which is unsubstituted or substituted by $C_{1-4}$-alkyl, or they are each isopropyl, sec-butyl or isobutyl, is 40–60 percent by weight, based on the total copolyamide and if $R_5$ and $R_6$ independently of one another are each a group —CH($R_7$)($R_8$) it is 50–70 percent by weight, based on the total copolyamide with these weight percentages in the case of amide-forming derivatives of isophthalic acid, of terephthalic acid or of a dicarboxylic acid of the formula III relating to identical functional groups.

2. A transparent copolyamide according to claim 1 which is obtained by reaction of a mixture (A) consisting of essentially stoichiometric amounts of a diamine of the formula I and isophthalic acid, or an amide-forming derivative thereof, with a mixture (B) consisting of essentially stoichiometric amounts of a diamine of the formula II and adipic acid, or an amide-forming derivative thereof, wherein $R_1$ to $R_4$ independently of one another are each hydrogen or methyl, and $R_5$ and $R_6$ are each cycloalkyl having 5–8 ring C atoms, and wherein the proportion of mixture (A) is 45–55 percent by weight, based on the total copolyamide with these weight percentages in the case of amide-forming derivatives of isophthalic acid or of adipic acid relating to identical functional groups.

3. A transparent copolyamide according to claim 1 which is obtained by reaction of a mixture (A) consisting of essentially stoichiometric amounts of a diamine of the formula I and isophthalic acid, or an amide-forming derivative thereof, with a mixture (B) consisting of essentially stoichiometric amounts of a diamine of the formula II and adipic acid, or an amide-forming derivative thereof, wherein $R_1$ to $R_4$ independently of one another are each hydrogen or methyl, and $R_5$ and $R_6$ are each isopropyl, isobutyl or sec-butyl, and wherein the proportion of mixture (A) is 50–60 percent by weight, based on the total copolyamide with these weight percentages in the case of amide-forming derivatives of isophthalic acid or of adipic acid relating to identical functional groups.

4. A transparent copolyamide according to claim 1 which is obtained by reaction of a mixture (A) consisting of essentially stoichiometric amounts of a diamine of the formula I and isophthalic acid, or an amide-forming derivative thereof, with a mixture (B) consisting of essentially stoichiometric amounts of a diamine of the formula II and adipic acid, or an amide-forming derivative thereof, wherein $R_1$ $R_4$ independently of one another are each hydrogen or methyl, $R_5$ and $R_6$ are each a group —CH($R_7$) ($R_8$), $R_7$ is hydrogen or alkyl having 2–4 C atoms, and $R_8$ is alkyl having 2–6 C atoms, and wherein the proportion of mixture (A) is 55–68 percent by weight, based on the total copolyamide with these weight percentages in the case of amide-forming dderivatives of isophthalic acid or of adipic acid relating to identical functional groups.

5. A transparent copolyamide according to claim 2 wherein $R_1$ and $R_4$ are each methyl, $R_2$ and $R_3$ are each hydrogen, $R_5$ and $R_6$ are each cyclohexyl, and wherein the proportion of mixture (A) is 45–50 percent by weight based on the total copolyamide.

6. A transparent copolyamide according to claim 3, wherein $R_1$ and $R_4$ are each methyl, $R_2$ and $R_3$ are each hydrogen, and $R_5$ and $R_5$ are each isopropyl, and wherein the proportion of mixture (A) is 50–55 percent by weight based on the total copolyamide.

7. A transparent copolyamide according to claim 4, wherein $R_1$ and $R_4$ are each methyl, $R_2$ and $R_3$ are each hydrogen, $R_7$ is hydrogen, and $R_8$ is n-pentyl, and wherein the proportion of mixture (A) is 60–66 percent by weight based on the total copolyamide.

8. A molded article of the copolyamide according to claim 1.

* * * * *